(12) United States Patent
Choi et al.

(10) Patent No.: US 8,753,777 B2
(45) Date of Patent: *Jun. 17, 2014

(54) LITHIUM SECONDARY BATTERY CONTAINING CATHODE MATERIALS HAVING HIGH ENERGY DENSITY AND ORGANIC/INORGANIC COMPOSITE POROUS MEMBRANE

(71) Applicant: LG Chem, Ltd., Seoul (KR)

(72) Inventors: Seungeun Choi, Daejeon (KR); Eungyoung Goh, Daejeon (KP); Hyang Mok Lee, Daejeon (KN); Heegyoung Kang, Cheonan-si (KR); Sangbaek Ryu, Daejeon (KR); Kiwoong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/789,810

(22) Filed: Mar. 8, 2013

(65) Prior Publication Data

US 2013/0187082 A1  Jul. 25, 2013

Related U.S. Application Data

(63) Continuation of application No. 13/223,731, filed on Sep. 1, 2011, which is a continuation of application No. PCT/KR2010/001304, filed on Mar. 3, 2010.

(30) Foreign Application Priority Data

Mar. 3, 2009 (KR) .................... 10-2009-0018108

(51) Int. Cl.
*H01M 4/131* (2010.01)
*H01M 4/50* (2010.01)
*H01M 4/52* (2010.01)
*H01M 4/525* (2010.01)

(52) U.S. Cl.
USPC ... 429/231.3; 429/223; 429/224; 429/231.95; 252/182.1

(58) Field of Classification Search
USPC ......... 429/231.3, 223, 224, 231.95, 232, 249, 429/251, 176
See application file for complete search history.

(56) References Cited

U.S. PATENT DOCUMENTS

| 6,333,128 B1 | 12/2001 | Sunagawa et al. |
| 2002/0028380 A1 | 3/2002 | Tanjo et al. |

(Continued)

FOREIGN PATENT DOCUMENTS

| KR | 11-54120 A | 2/1999 |
| KR | 10-2007-0055979 A | 5/2007 |
| KR | 10-2007-0109854 A | 11/2007 |
| WO | WO 2007/061269 A1 | 5/2007 |
| WO | WO 2007/129848 A1 | 11/2007 |

OTHER PUBLICATIONS

International Search Report, dated Sep. 29, 2010, for Application No. PCT/KR2010/001304.

(Continued)

*Primary Examiner* — Kenneth Douyette

(74) *Attorney, Agent, or Firm* — Birch, Stewart, Kolasch & Birch, LLP

(57) ABSTRACT

Disclosed is a secondary battery including a cathode, an anode, a membrane and an electrolyte, wherein the cathode contains a mixture of a first cathode material defined herein and a second cathode material selected from the group consisting of a second-(a) cathode material defined herein and a second-(b) cathode material defined herein, and a combination thereof, wherein a mix ratio of the two cathode materials (first cathode material:second cathode material) is 50:50 to 90:10, and the membrane is an organic/inorganic composite porous membrane including (a) a polyolefin-based membrane substrate and (b) an active layer in which one or more areas selected from the group consisting of the surface of the substrate and a portion of pores of the substrate are coated with a mixture of inorganic particles and a binder polymer, wherein the active layer has a structure in which the inorganic particles are interconnected and fixed through a binder polymer and porous structures are formed by the interstitial volume between the inorganic particles.

19 Claims, 2 Drawing Sheets

(56) References Cited

U.S. PATENT DOCUMENTS

| | | |
|---|---|---|
| 2005/0037263 A1 | 2/2005 | Wang et al. |
| 2006/0216600 A1 | 9/2006 | Inagaki et al. |
| 2006/0240290 A1 | 10/2006 | Holman et al. |
| 2007/0015058 A1 | 1/2007 | Takezawa et al. |
| 2007/0122716 A1 | 5/2007 | Seo et al. |
| 2008/0026292 A1 | 1/2008 | Paulsen et al. |
| 2009/0029245 A1 | 1/2009 | Ibaragi et al. |

OTHER PUBLICATIONS

Liu et al., "A mixture of $LiNi_{1/3}Co_{1/3}Mn_{1/3}O_2$ and $LiCoO_2$ as positive active material of LIB for power application", Journal of Power Sources, vol. 174, No. 2, pp. 1126-1130, 2007 (Available online Jun. 30, 2007).

US 8,753,777 B2

LITHIUM SECONDARY BATTERY CONTAINING CATHODE MATERIALS HAVING HIGH ENERGY DENSITY AND ORGANIC/INORGANIC COMPOSITE POROUS MEMBRANE

CROSS REFERENCE TO RELATED APPLICATIONS

This application is a Continuation of co-pending U.S. application Ser. No. 13/223,731, filed Sep. 1, 2011, which is a Continuation of PCT/KR2010/001304 filed on Mar. 3, 2010, which claims priority under 35 U.S.C. 119(a) to Patent Application No. 10-2009-0018108 filed in the Republic of Korea on Mar. 3, 2009. All of which are hereby expressly incorporated by reference into the present application.

TECHNICAL FIELD

The present invention relates to a lithium secondary battery comprising cathode materials with a high energy density and an organic/inorganic composite porous membrane. More specifically, the present invention relates to a lithium secondary battery comprising a cathode and an organic/inorganic composite porous membrane, wherein the cathode contains a mixture of a first cathode material having a specific composition and a second cathode material having a specific composition, wherein a mix ratio of the two cathode materials (first cathode material:second cathode material) is 50:50 to 90:10, and the organic/inorganic composite porous membrane comprises (a) a polyolefin-based membrane substrate and (b) an active layer in which one or more areas selected from the group consisting of the surface of the substrate and a portion of pores present in the substrate are coated with a mixture of inorganic particles and a binder polymer, wherein the active layer has a structure in which inorganic particles are interconnected and fixed through a binder polymer and porous structures are formed by the interstitial volume between the inorganic particles.

BACKGROUND ART

In recent years, chargeable and dischargeable secondary batteries are widely used as energy sources of wireless mobile equipment. Of these, lithium secondary batteries are generally used due to advantages such as high energy density, discharge voltage and power stability.

Lithium secondary batteries use metal oxide such as $LiCoO_2$ as a cathode material and carbon as an anode material and are fabricated by inserting a polyolefin-based porous membrane between an anode and a cathode and swelling a non-aqueous electrolyte containing a lithium salt such as $LiPF_6$. $LiCoO_2$ is commonly used as a cathode material for lithium secondary batteries. $LiCoO_2$ has several disadvantages of being relatively expensive, having low charge/discharge capacity of about 150 mAh/g and unstable crystal structure at a voltage of 4.3 V or higher and the risk of reacting with an electrolyte to cause combustion. Furthermore, $LiCoO_2$ is disadvantageous in that it undergoes great variation in physical properties depending upon variation in parameters in the preparation process thereof. In particular, cycle properties and high-temperature storage properties at high electric potential may be greatly varied depending on partial variations of process parameters.

In this regard, methods to make batteries containing $LiCoO_2$ operate at high electric potential, such as coating the outer surface of $LiCoO_2$ with a metal (such as aluminum), thermally treating $LiCoO_2$, or mixing $LiCoO_2$ with other materials, have been suggested. Secondary batteries comprising such a cathode material exhibit low stability at high electric potential or have a limitation of application to mass-production.

In recent years, secondary batteries receive great attention as power sources of electric vehicles (EVs), hydride electric vehicles (HEV) or the like which are suggested as alternatives to conventional gasoline vehicles, diesel vehicles or the like using fossil fuels to solve air pollution caused thereby. Use of secondary batteries is expected to further increase and the above problems and problems associated with stability of batteries and high-temperature storage properties at high electric potentials arise.

In an attempt to solve the problems of $LiCoO_2$, methods using a mixture of two or more different lithium transition metal oxides as a cathode material were suggested. These methods solve the drawbacks of a cathode material in which the respective lithium transition metal oxide is used singly.

However, conventional mixture-type cathode materials have a limitation of the difficulty of obtaining superior synergetic effects to the case of simple combination of two ingredients.

Meanwhile, a great deal of methods to solve battery stability has been suggested. However, a clear method for solving combustion of batteries caused by compulsory internal short circuit (in particular, customer-abuse) has not been suggested to date.

In recent years, coating a polyolefin-based membrane with an inorganic substance such as calcium carbonate or silica to prevent internal short circuit caused by dendrite growth in batteries was reported in U.S. Pat. No. 6,432,586. However, use of common inorganic particles has no mechanism to prevent internal short circuits caused by external impact, having no great effects on substantially improving stability. In addition, parameters such as thickness, pore size and porosity of mentioned inorganic layers are not suitably determined and the inorganic particles have no capability to transfer lithium. Accordingly, considerable deterioration in battery capability is inevitable.

DISCLOSURE

Technical Problem

Therefore, the present invention has been made to solve the above problems and other technical problems that have yet to be resolved.

An object of the present invention is to provide a secondary battery which comprises a cathode material exhibiting a high energy density and superior capacity properties, and an organic/inorganic composite porous film membrane which improves both performance and stability and can thus exert superior rate properties and improved stability.

Technical Solution

In accordance with an aspect of the present invention, the above and other objects can be accomplished by the provision of a secondary battery comprising a cathode, an anode, a membrane and an electrolyte, wherein the cathode comprises a mixture of a first cathode material defined below and a second cathode material selected from the group consisting of a second-(a) cathode material defined below and a second-(b) cathode material defined below, and a combination thereof, wherein a mix ratio of the two cathode materials (first cathode material:second cathode material) is 50:50 to 90:10, and the membrane is an organic/inorganic composite porous membrane comprising (a) a polyolefin-based membrane substrate and (b) an active layer in which one or more areas selected from the group consisting of the surface of the substrate and a portion of pores present in the substrate are coated with a mixture of inorganic particles and a binder polymer, wherein the active layer has a structure in which the inorganic particles are interconnected and fixed through a binder polymer and porous structures are formed by the interstitial volume between the inorganic particles.

[First Cathode Material]

A cathode material represented by Formula 1 below:

$$Li_x(Co_yA_mD_z)O_t \tag{1}$$

wherein $0.8 \leq x \leq 1.2$, $D \leq z \leq 0.3$, $1.8 \leq t \leq 4.2$, $(0.8-m-z) \leq y \leq (2.2-m-z)$, $0 \leq m \leq 0.3$, A is at least one selected from Mg and Ca, and D is at least one selected from the group consisting of Ti, Zr, Hf, V, Nb, Ta; Cr, Mo, W, Mn, Tc, Re, Fe, Ru, Os, Co, Rh, Ir, Ni, Pd, Pt, Cu, Au, Ag, Zn, Cd, Hg, B, Al, Ga, In, TI, C, Si, Ge, Sn, Pb, N, P, As, Sb and Bi;

[Second-(a) Cathode Material]

A cathode material represented by Formula 2a below:

$$Li_x(Ni_{1-a-b}Mn_aCo_b)_yO_2 \tag{2a}$$

wherein $0.05 \leq a \leq 0.4$, $0.1 \leq b \leq 0.4$, $0.4 \leq 1-a-b \leq 0.7$, $0.95 \leq x \leq 1.05$, $1.9 \leq x+y \leq 2.3$;

[Second-(b) Cathode Material]

A cathode material which contains a transition metal mixture of Ni, Mn and Co, has an average oxidation number of all transition metals except for lithium, larger than +3 and satisfies Equations 2b and 2c below:

$$1.1 < m(Ni)/m(Mn) < 1.5 \tag{2b}$$

$$0.4 < m(Ni^{2+})/m(Mn^{4+}) < 1 \tag{2c}$$

wherein $m(Ni)/m(Mn)$ is a molar ratio of nickel to manganese and $(Ni^{2+})/m(Mn^{4+})$ is a molar ratio of $Ni^{2+}$ to $Mn^{4+}$.

In the present invention, the cathode material is a mixture of two types of lithium transition metal oxides, wherein the mixture consists of the first cathode material and the second cathode material at a ratio of 50:50 to 90:10, thus exerting high energy density and exhibiting superior capacity properties. A more preferred mix ratio is 50:50 to 70:30.

As a result of intense and repeated research, the inventors of the present invention discovered that, when the second cathode material is present in a mix ratio of 50% or less, lithium secondary batteries can exert considerably superior discharge capacity maintenance and desired rate properties at C-rate. Specifically, when the cathode material according to the present invention is used, lithium secondary batteries having a volumetric energy density (VED) of 478 Wh/l or more and a gravimetric energy density (GED) of 201 Wh/g can be fabricated.

On the other hand, when the second cathode material is present in a mix ratio exceeding 50%, discharge capacity considerably decreases, and in particular, as C-rate increases, this decrease disadvantageously becomes serious, and when the second cathode material is present in a mix ratio less than 10%, superior capacity properties cannot be disadvantageously exerted.

The cathode materials may be surface-coated with a material such as $Al_2O_3$ or mixed with $Al_2O_3$ to improve properties thereof.

The first cathode material is for example preferably $LiCoO_2$, but the material is not limited thereto.

Of the second cathode materials, the second-(a) cathode material satisfies a specific composition defined by Formula (2a) (see FIG. 1), thus exerting high capacity, superior cycle stability, superior storage stability and high temperature stability. Hereinafter, the second-(a) cathode material will be described in detail.

A total nickel molar ratio $(1-a-b)$ is 0.4 to 0.7, an excess amount, as compared to manganese and cobalt. When the content of nickel is less than 0.4, high capacity cannot be expected, and when the content exceeds 0.7, safety is disadvantageously greatly deteriorated.

The content of the cobalt (b) is 0.1 to 0.4. When the content of cobalt is excessively high (b>0.4), the overall cost of raw materials increases and reversible capacity slightly decreases due to the high content of cobalt. On the other hand, when the content of cobalt is excessively low (b<0.1), both sufficient rate properties and high powder density of batteries cannot be accomplished.

When the content of lithium is excessively high (x>1.05), in particular, safety may be disadvantageously deteriorated during cycles at a high voltage (U=4.35 V) at T=60° C. On the other hand, when the content of lithium is excessively low (x<0.95), rate properties are lowered and reversible capacity may decrease.

In a preferred embodiment, in the second-(a) cathode material, lithium ions are intercalated and deintercalated between mixed transition metal oxide layers ("MO layers"), some Ni ions derived from MO layers are inserted into intercalation and deintercalation layers of the lithium ions ("reversible lithium layer"), to bond the MO layers.

Hereinafter, in this specification, Ni inserted into the reversible lithium layer may also be referred to as an "inserted Ni".

Specifically, there was a conventional concept in which, in a case where some nickel moves downward from MO layers to the reversible lithium layer and are fixed to the reversible lithium layer, as shown in FIG. 2, the nickel will interfere with intercalation and deintercalation of lithium. On the other hand, the inventors of the present invention confirmed that, in this case, it is possible to stabilize crystal structures and prevent a problem in which the crystal structures are broken due to intercalation and deintercalation of lithium.

Accordingly, it is possible to avoid additional structural collapse by oxygen detachment, prevent further production of $Ni^{2+}$, improve both lifespan and safety, considerably improve battery capacity and cycle properties, and afford desired rate properties. The technical concept of the present invention is considered to be a major advance that will completely usurp conventional technology.

In the second-(a) cathode material, $Ni^{2+}$ and $Ni^{3+}$ are preferably present together in MO layers. Of these, some $Ni^{2+}$ may be inserted into the reversible lithium layer. That is, the Ni ions inserted into the reversible lithium layer are preferably $Ni^{2+}$.

This $Ni^{2+}$ has a considerably similar size to lithium ions ($Li^+$) and is inserted into the reversible lithium layer, thus blocking structural collapse caused by the repulsive force of MO layers when lithium ions are intercalated during charging without deforming crystal structures.

In addition, the $Ni^{2+}$ is inserted between MO layers and supports the same. The $Ni^{2+}$ is contained in an amount capable of stably supporting the space provided between MO layers and thereby improving the desired charge stability and cycle stability. In addition, $Ni^{2+}$ is inserted in an amount which does not interfere with intercalation and deintercalation of lithium ions in the reversible lithium layer, to prevent deterioration in rate properties. That is, when a molar fraction of $Ni^{2+}$ inserted into the reversible lithium layer is excessively high, the amount of anions increases, and rock salt structures which have no electrochemical reactivity are locally formed and interfere with charging and discharging and thus cause a decrease in discharge capacity.

Generally, taking into consideration the above points, a molar fraction of $Ni^{2+}$ inserted into the reversible lithium layer is preferably 0.03 to 0.07, based on the total weight of transition metals of the second-(a) cathode material.

Meanwhile, as a ratio of Li to the transition metal (M) (Li/M) decreases, the amount of Ni inserted into the MO layer gradually increases. When an excessively great amount of Ni goes downward to the reversible lithium layer, Ni interferes with movement of Li+ during charging and discharging, thus disadvantageously decreasing reversible capacity or deteriorating rate properties. On the other hand, when the ratio of Li/M is excessively high, the amount of Ni inserted into the MO layer is excessively small, thus disadvantageously causing structural instability and deteriorating battery safety and lifespan. Furthermore, in the case of excessively high Li/M value, the amount of un-reacted $Li_2CO_3$ increases, that is, a great amount of impurities is produced, thus causing deterioration of chemical resistance and high-temperature stability. Accordingly, in a preferred embodiment, a ratio of Li:M in $LiNiMO_2$ may be 0.95:1 to 1.04:1.

In a preferred embodiment, the second-(a) cathode material does not substantially contain a water-soluble base (in particular, $Li_2CO_3$) as an impurity.

Generally, nickel-based lithium-containing transition metal oxide contains a great amount of water-soluble bases such as lithium oxide, lithium sulfate, lithium carbonate and the like. Such a water-soluble base may be firstly a base such as $Li_2CO_3$ and LiOH present in $LiNiMO_2$, and be secondly a base produced by ion exchange ($H^+$ (water)<--->$Li^+$ (surface, bulky outer surface)) on the surface of $LiNiMO_2$. The latter is commonly negligible.

The first water-soluble base is generally produced by unreacted lithium material during sintering. The reason is that a relatively great amount of lithium is added and sintered at a low temperature to prevent collapse of layered crystal structures of conventional nickel-based lithium-containing transition metal oxides, and as a result, nickel-based lithium-containing transition metal oxides have more grain boundaries, as compared to cobalt-based oxides and lithium ions are not sufficiently reacted during sintering.

On the other hand, as mentioned above, the second-(a) cathode material stably maintains layered crystal structures, can be sintered at relatively high temperatures under an air atmosphere and thus has relatively few crystal grain boundaries. In addition, remaining of unreacted lithium on particle surfaces is prevented and lithium salts such as lithium carbonate and lithium sulfate are thus not substantially present on the particle surfaces. In addition, in the process of preparing the second-(a) cathode material, addition of an excess lithium source is unnecessary and a problem of formation of impurities by the un-reacted lithium source left in a powder can be fundamentally prevented.

As a result, many problems associated with presence of water-soluble bases, in particular, problems in which decomposition reaction of an electrolyte is accelerated at high temperatures to produce a gas and thereby impair battery safety, can be solved. Accordingly, lithium secondary batteries of the present invention have advantages of superior storage stability, high temperature stability and the potential for mass-production at a low cost.

Meanwhile, of the second cathode material, the second-(b) cathode material provides considerably improved high rate charge and discharge properties due to a superior layered crystal structure. Hereinafter, the second-(b) cathode material will be described in detail.

As a preferred example, the layered crystal structures is an $\alpha$-$NaFeO_2$ layered crystal structure.

It was known in the art that presence of $Ni^{2+}$ and $Mn^{4+}$ in equivalent amounts makes an average oxidation number of transition metal ions +3 in order to obtain a desired layered structure. However, since $Ni^{2+}$ has a size substantially similar to $Li^+$, it moves to the lithium layer and readily forms a sodium salt, thus disadvantageously causing deterioration in electrochemical properties.

Accordingly, the inventors of the present invention conducted a great deal of research to prepare a cathode active material which has a stable layered crystal structure and exhibits superior capacity and rate properties. As a result, the inventors discovered that the stable layered crystal structure depends on the size difference between the lithium ion and the transition metal ion, rather than $Ni^{2+}$ and $Mn^{4+}$.

Specifically, the inventors confirmed that, in lithium composite transition metal oxide having a layered crystal structure, as size difference between the ions constituting the reversible lithium layer and the MO layer (that is, lithium ions and transition metal ions) increases, the two layers can be readily separated and grown.

In this regard, use of metal elements having a small ion size for the MO layer to increase size difference between ions may be considered. However, this approach enables formation of the desired layered structure, but has a limitation of relatively low capacity due to decrease in the number of metal ions to transfer electrons.

In this regard, the inventors of the present invention attempted to accomplish the desired layered crystal structure without causing deterioration in capacity. As a result, the inventors confirmed that the size difference between the ions is expressed by the bonding distance between each ion and the oxygen ion or bonding force therebetween, and as a metal having cationic characteristics has an increased oxidation number, it has a decreased ionic radius. In addition, the inventors considered that the difference between the MO layer and the lithium layer can be increased by increasing the oxidation number of transition metals. This expectation was confirmed through a great deal of experimentation.

The idea that the layered crystal structure can be suitably formed through increased size difference between the lithium ion and the transition metal ion by increasing the average oxidation number of the transition metal to a level higher than +3 is in contrast to the conventional idea accepted in the art that the average oxidation number of transition metals should be adjusted to +3 to stabilize the layered crystal structure.

Meanwhile, in a case where the contents of Ni and Mn are substantially equivalent in accordance with a conventional method, $Mn^{4+}$ ions induce formation of $Ni^{2+}$ ions, and disadvantageously, in a Mn-rich compound, a great amount of $Ni^{2+}$ is thus arranged in the lithium layer.

The inventors of the present invention predicted that the best method to increase the oxidation number of transition metals would be to adjust the total average oxidation number to +3 or higher by decreasing the amount of $Ni^{2+}$, which can be readily permeated into the lithium layer. This prediction is based on the idea that the amount of $Ni^{3+}$ having a size smaller than $Ni^{2+}$ increases, thus causing an increase in size difference between the ions.

Accordingly, the second-(b) cathode material contains nickel and manganese wherein nickel is present in an amount higher than manganese (See Equation (2b)) and $Ni^{2+}$ is present in an amount smaller than $Mn^{4+}$ (See Equation (2c)).

Specifically, the second-(b) cathode material is a lithium nickel-manganese-cobalt oxide wherein (i) an average oxidation number of nickel-manganese-cobalt, all transition metals except for lithium is larger than +3, (ii) nickel is present in an amount larger than manganese and (iii) $Ni^{2+}$ is present in an amount smaller than $Mn^{4+}$.

Such a lithium nickel-manganese-cobalt oxide maintains an average oxidation number of transition metals at a level larger than +3, thus considerably decreasing the amount of transition metals present in the reversible lithium layer based on the stable crystal structure of the cathode material and improving mobility of lithium ions and rate properties as well as capacity.

Regarding the aspect (i), the second-(b) cathode material has an average oxidation number of transition metals except lithium, higher than +3, thus decreasing an average size of transition metal ions, increasing the size difference between lithium ions, and promoting separation between layers, thereby forming a stable layered crystal structure.

When the average oxidation number of transition metals is excessively increased, electric charges capable of transferring lithium ions are decreased, thus disadvantageously decreasing capacity. Preferably, the average oxidation number of transition metals is higher than 3.0 and not higher than 3.5, more preferably, 3.01 to 3.3, more particularly preferably, 3.1 to 3.3.

In this case, the total average oxidation number of Mn and Ni corresponding thereto is 3.0 to 3.5, preferably, 3.1 to 3.3.

As herein used, the expression "average oxidation number of transition metals except for lithium" means, that, for example, an average oxidation number of lithium ions is not considered, although some lithium ions are contained in the site of transition metals.

Control of average oxidation number of transition metals is for example carried out by controlling a ratio of a transition metal of a transition metal precursor and the amount of a lithium precursor reacted in the process of preparing lithium transition metal oxide.

Regarding the aspect (ii), the second-(b) cathode material is composed of a material in which a molar ratio of nickel to manganese is higher than 1.1 and lower than 1.5, as represented by Equation (2b) below.

$$1.1 < m(Ni)/m(Mn) < 1.5 \quad (2b)$$

As such, when nickel is present in an larger amount than manganese, nickel in an amount corresponding to the difference between the nickel content and the manganese content, is changed to $Ni^{3+}$, thus decreasing ion size. Accordingly, the average size difference between the lithium ion and the transition metal ion increases, thus minimizing permeation of $Ni^{2+}$ into the lithium layer and improving stability of the layered crystal structure.

When m(Ni)/m(Mn) is larger than 1.5, disadvantageously, safety is deteriorated and preparation cost of active materials increases due to decreased Mn content. In a more preferred embodiment, the ratio of m(Ni)/m(Mn) may be 1.2 to 1.4.

On the other hand, although the content of manganese is larger than that of nickel, in a case where an average oxidation number of transition metals is +3 or higher, the layered crystal structures are formed, but +4 ions which do not contribute to charging/discharging are increased and capacity is thus decreased.

As mentioned above, in the case where the second-(b) cathode material according to the present invention contains excess nickel, as compared to manganese, the nickel is composed of nickel (a) present in an excessive amount, as compared to the manganese content and nickel (b) present in an amount corresponding to the manganese content.

The nickel has an average oxidation number higher than 2+.

Preferably, the nickel (a) is $Ni^{3+}$, and the nickel (b) includes both $Ni^{2+}$ and $Ni^{3+}$.

Of the nickel (b) including $Ni^{2+}$ and $Ni^{3+}$, a ratio of $Ni^{3+}$ is preferably 11 to 60%. That is, when the ratio is lower than 11%, desired electrochemical properties cannot be obtained, and when the ratio is higher than 60%, variation in oxidation number is excessively small, thus disadvantageously increasing a capacity decrease and a dispersed lithium amount. In this case, the average oxidation number of manganese and nickel is about 3.05 to about 3.35.

Regarding the aspect (iii), the second-(b) cathode material is composed of a material in which a molar ratio of $Ni^{2+}$ to $Mn^{4+}$ is higher than 0.4 and lower than 1, as represented by Equation (2c). That is, $Ni^{2+}$ and $Mn^{4+}$ are not present in equivalent amounts, but $Ni^{2+}$ is present in a smaller amount than $Mn^{4+}$.

$$0.4 < m(Ni^{2+})/m(Mn^{4+}) < 1 \quad (2c)$$

When the ratio of $m(Ni^{2+})/m(Mn^{4+})$ is 1 or higher, the average oxidation number of transition metals does not increase and ion size difference thus cannot be induced, and when the ratio is 0.4 or lower, the oxidation number of transition metals is excessively high, capacity is deteriorated due to decrease in amount of movable electric charges. When the ratio of $m(Ni^{2+})/m(Mn^{4+})$ is higher than 0.4 and is equivalent to or lower than 0.9, considerably superior electrochemical properties can be obtained.

In the second-(b) cathode material, the content of cobalt (Co) in transition metals may be lower than 10 mol % of the total transition metal content. An increase in cobalt content causes disadvantages of cost increase and unstable $Co^{4+}$ and low stability during charging.

As mentioned above, in the second-(b) cathode material, since nickel is present in an amount higher than manganese and an average oxidation number of transition metals is higher than +3, the size difference between the lithium ions and the transition metal ions increases, layer separation is accelerated, and insertion of $Ni^{2+}$ into the lithium layer can be minimized. In the cathode material, the content of nickel inserted into lithium sites is lower than 5 mol %, as a ratio of $Ni(Ni^{2+})$ sites with respect to the total Li sites.

Nickel, manganese and cobalt, as transition metals present in the second-(b) cathode material may be partially substituted by other metal element (s), and preferably by other metal (s), anionic element (s) or the like in a small amount of 5% or less so long as they maintain layered crystal structures. Obviously, this case is within the scope of the present invention so long as the features of the present invention are satisfied.

Meanwhile, the first cathode material preferably may have a monolithic structure. Accordingly, the first cathode material has no or little inner porosity and exhibits improved stability of crystal particles, as the size of particles increases, thus enabling easy manufacture of batteries comprising the same and improving manufacturing process efficiency.

For example, the first cathode material is a potato shaped monolithic particle and may have D50 of 10 μm or more, preferably 15 μm or more.

Meanwhile, the second cathode material preferably has an agglomerated structure, that is, a form of an agglomerate of micro powders and may have an inner porosity. Such an agglomerated particle structure maximizes a surface area which reacts with an electrolyte, thus exerting high rate properties and increasing reversible capacity of the cathode.

For example, the agglomerated second cathode material is in the form of an agglomerate of microparticles of 1 μm to 5 μm and has D50 of 10 μm or less, preferably 8 μm or less, more preferably 4 to 7 μm. Particularly preferably, 90% or more of microparticles having a size of 1 to 4 μm (D50) may constitute an agglomerate.

The membrane is an organic/inorganic composite porous membrane, prepared by applying inorganic particles and a binder polymer as active layer ingredients onto a polyolefin-based membrane substrate. The membrane has an inherent porous structure of the membrane material substrate as well as a uniform porous structure formed by an interstitial volume between inorganic particles used as the active layer ingredient.

Such an organic/inorganic composite porous membrane has an advantage of suppression of increase in battery thickness caused by swelling in the formation process, as compared to common membranes. In a case where a gelable polymer is used as the binder polymer ingredient to swell a liquid electrolyte, the gelable polymer may also be used as the electrolyte.

In addition, the organic/inorganic composite porous membrane includes an active layer and a polyolefin-based membrane substrate, each provided with a plurality of uniform porous structures. These pores enable smooth movement of lithium ions and realize high swelling due to filling of a great amount of electrolyte, thus contributing to improvement of battery performance.

The organic/inorganic composite porous membrane composed of the inorganic particles and the binder polymer is free of thermal contraction at high temperatures due to heat resistance of inorganic particles. Accordingly, in electrochemical devices using the organic/inorganic composite porous film as a membrane, the organic/inorganic composite porous active layer makes both electrodes not completely short-circuited and, even though short-circuited, suppresses wide extension of the short-circuited region, thus contributing to improvement of battery safety, although the membrane is broken in batteries under harsh conditions caused by interior or exterior factors such as high temperatures, overcharging and exterior impact.

The organic/inorganic composite porous membrane is formed by directly coating a polyolefin-based membrane and has a structure in which pores present on the surface of the polyolefin-based membrane substrate are anchored with the active layer to physically firmly bond the active layer to the porous substrate. Accordingly, the membrane can solve problems associated with mechanical and physical properties such as brittleness and exhibit superior interfacial adhesion force between the polyolefin-based membrane substrate and the active layer and thus decreased interfacial resistance. Actually, the organic/inorganic composite porous membrane has a structure in which the organic/inorganic composite active layer and the porous substrate are closely bonded to each other, porous structures present in the porous substrate are not affected by the active layer and maintain an original state, and the active layer has an inherent uniform porous structure of inorganic particles. Such a porous structure is filled with a liquid electrolyte which will be inserted in a subsequent process. For this reason, interfacial resistance generated between the inorganic particles or between inorganic particles and the binder polymer advantageously decreases.

The organic/inorganic composite porous membrane can exhibit superior adhesion force by controlling contents of inorganic particles and binder polymer, active layer ingredients present in the membrane, thus simplifying battery assembly processes.

In the organic/inorganic composite porous membrane, one of the active layer ingredients formed on the surface and/or a part of porous regions of the polyolefin-based membrane substrate is an inorganic particle commonly used in the art. The inorganic particles are provided with vacancies therebetween which form micropores and serve as spacers to maintain the physical shape thereof. In addition, the inorganic particles generally do not lose their physical properties even at high temperatures of 200° C. or higher, thus imparting heat resistance to the formed organic/inorganic composite porous film.

Any inorganic particles can be used without particular limitation so long as they are electrochemically stable. That is, inorganic particles used in the present invention are not particularly limited so long as they do not cause oxidation and/or reduction reactions within an operation voltage range of applied batteries (for example, 0 to 5V based on $Li/Li^+$). In particular, when inorganic particles having the capability of transferring electrons are used, ionic conductivity in electrochemical devices increases and battery performance can thus be improved. Use of inorganic particles having an ionic conductivity as high as possible is preferred. In addition, when the inorganic particles have a high density, they are not easily dispersed in the process of coating and they increase the weight of manufactured batteries. Use of inorganic particles having a density as low as possible is preferred. In addition, inorganic materials having a high dielectric constant contribute to an increase in the degree of dissociation electrolyte salts such as lithium salts in liquid electrolytes and improve ionic conductivity of electrolytes.

For these reasons, the inorganic particles have a dielectric constant of 5 or more, preferably 10 or more, inorganic particles having high a dielectric constant, inorganic particles having piezoelectricity, inorganic particles capable of transferring lithium ions, or a combination thereof are preferred.

The piezoelectric inorganic particles are nonconductive at room pressure, but have the property of transferring electricity due to variation in inner structures, when a predetermined pressure is applied thereto. The piezoelectric inorganic particles exhibit high permittivity (dielectric constant of 100 or more). When piezoelectric inorganic particles extend or contract in response to an applied predetermined pressure, they generate electric charges and one side thereof is positively charged and the other side thereof is negatively charged, thus causing a potential difference between both sides.

When the inorganic particles having this property are used as a porous active layer ingredient and both electrodes are internally short-circuited by outer impact such as local crush or nails, a cathode and an anode do not directly contact each other due to inorganic particles coated on the membrane, potential difference occurs in inorganic particles due to piezoelectricity thereof and electron moves, that is, fine current flows between both electrodes, thus causing broad decrease in battery voltage and thus improvement of safety.

Examples of piezoelectric inorganic particles include, but are not limited to, $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$) and combinations thereof.

The inorganic particles capable of transferring lithium ions refer to inorganic particles which contain lithium elements, but do not store lithium elements and transfer lithium ions. The inorganic particles are capable of transferring and moving lithium ions due to defects present in particle structures, thus improving ionic conductivity of lithium in batteries and thus improving battery performance.

Examples of the inorganic particles capable of transferring lithium ions include, but are not limited to, lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glasses ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$-based glasses ($Li_xSi_yS_z$, $0<x<3$, $0<y<2$, $0<z<4$) such as $Li_3PO_4$—$Li_2S$—$SiS_2$, $P_2S_5$-based glasses ($Li_xP_yS_z$, $0<x<3$, $0<y<3$, $0<z<7$) such as $LiI$—$Li_2S$—$P_2S_5$ and combinations thereof.

In addition, the inorganic particles having a dielectric constant of 5 or more include, but are not limited to, $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$ and combinations thereof. When the highly permissive inorganic particles, piezoelectric inorganic particles and inorganic particles capable of transferring lithium ions are used in combination thereof, the effects of the inorganic particles are synergized.

In the organic/inorganic composite porous membrane of the present invention, in addition to porous structures present in the membrane substrate, porous structures in the active layer can be formed, and both pore size and porosity can be controlled by controlling size and content of inorganic particles (the active layer ingredient of the membrane substrate) and a composition of inorganic particles with a binder polymer.

The size of the inorganic particles is not limited and is preferably 0.001 to 10 μm to form films with a uniform thickness and realize suitable porosity. When the size is smaller than 0.001 μm, dispersibility is deteriorated and physical properties of the organic/inorganic composite porous membrane cannot be controlled, and when the size exceeds 10 μm, the thickness of the organic/inorganic composite porous membrane manufactured using a constant content of solid increases, mechanical physical properties are deteriorated and internal short circuit may readily occur during battery charging and discharging due to excessively high pore size.

The content of the inorganic particles is not particularly limited and is preferably 50 to 99% by weight, more preferably 60 to 95% by weight, based on 100% by weight of the mixture of inorganic particles and binder polymer organic/inorganic composite porous membrane. When the content is less than 50% by weight, the content of polymers is excessively high, pore size and porosity decrease due to decrease in the space formed between inorganic particles, thus deteriorating performance of final batteries. Meanwhile, when the content exceeds 99% by weight, the content of polymers is excessively high, adhesion force between organic materials weakens and mechanical and physical properties of final organic/inorganic composite porous membranes are deteriorated.

In the organic/inorganic composite porous membrane of the present invention, other ingredients of the active layer formed on the surface and/or in a part of pores of polyolefin-based membrane substrate is a polymer commonly used in the art. In particular, a polymer having a glass transition temperature (Tg) as low as possible is preferable and a polymer having a glass transition temperature of −200 to 200° C. is more preferred. This serves to improve mechanical and physical properties such as flexibility and elasticity of films. The polymer efficiently serves as a binder which connects and stably fixes inorganic particles, and inorganic particles and the surface of the membrane substrate or the part of pores of the membrane and thereby prevents deterioration in mechanical and physical properties of the organic/inorganic composite porous membrane.

In addition, the binder polymer may have ionic conductivity. When polymers having ionic conductivity are used, performance of electrochemical devices can be further improved. Accordingly, the binder polymer preferably has as high a dielectric constant as possible.

In practice, dissociation degree of salts in electrolytes depends on the dielectric constant of an electrolyte solvent. For this reason, as the dielectric constant of the polymer increases, the dissociation degree of salts in the electrolyte of the present invention can be improved. The polymer may have a dielectric constant of 1.0 to 100 (frequency: 1 kHz), preferably 10 or more.

In addition to the functionalities, when a liquid electrolyte swells, the binder polymer is gelled and thus provides a high swelling degree. In practice, when the binder polymer exhibits a high electrolyte swelling degree, an electrolyte incorporated after battery assembly permeates into the polymer and the polymer containing the absorbed electrolyte has the capability of conducting electrolyte ions. Accordingly, the electrolytes of the present invention further improve performance of the electrochemical devices, as compared to conventional organic/inorganic composite electrolytes. In addition, as compared to conventional hydrophobic polyolefin-based membranes, the membrane of the present invention advantageously reduces wettability to electrolytes for batteries and can be applied to polar electrolytes for batteries which could not be conventionally used. Additionally, in a case where a polymer can be gelled when an electrolyte swells, the polymer reacts with the subsequent incorporated electrolyte and is thus gelled to produce an organic/inorganic composite electrolyte. As compared to conventional gel-type electrolytes, the produced electrolyte can be prepared in a simple process, exhibits high ionic conductivity and electrolyte swelling degree and improved battery performance. Accordingly, the polymer preferably has a solubility of 15 to 45 $MPa^{1/2}$, more preferably, 15 to 25 $MPa^{1/2}$, and 30 to 45 $MPa^{1/2}$. When the solubility is lower than 15 MPa½ and is higher than 45 MPa½, swelling of liquid electrolytes for conventional batteries is difficult.

Examples of useful binder polymers include, but are not limited to, polyvinylidene fluoride-co-hexafluoropropylene, polyvinylidene fluoride-cotrichloroethylene, polymethylmethacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymers, polyimide and combinations thereof. Any material may be used alone or in combination thereof so long as it exhibits the afore-mentioned properties.

The mix ratio of inorganic particles and binder polymer, the active layer ingredients, is not limited and may be controlled within the range of 10:90 to 99:1 (% by weight), preferably 80:20 to 99:1 (% by weight). When the mix ratio is lower than 10:90 (% by weight), the content of polymer is excessively high, pore size and porosity decrease due to decrease in spaces formed between the inorganic particles and performance of final batteries is deteriorated. Meanwhile, if the mix ratio exceeds 99:1 (% by weight), the content of polymer is excessively low and adhesion between inorganic materials weakens and mechanical physical properties of the final organic/inorganic composite porous membranes may thus be deteriorated. The active layer of the organic/inorganic composite porous membrane may further comprise, in addition to the inorganic particles and polymer, an additive well-known in the art.

In the organic/inorganic composite porous membrane, a substrate coated with the mixture of inorganic particles and binder polymer, the active layer ingredients, may be a polyolefin-based membrane commonly used in the art. Examples of the polyolefin-based membrane ingredients include high-density polyethylene, linear low-density polyethylene, low-density polyethylene, ultrahigh molecular weight polyethylene, polypropylene or derivatives thereof.

The thickness of the polyolefin-based membrane substrate is not particularly limited, and is preferably 1 to 100 μm, more preferably 5 to 50 μm. When the thickness is lower than 1 μm, mechanical and physical properties cannot be maintained and when the thickness is higher than 100 μm, the membrane substrate cannot serve as an ohmic layer.

The pore size and porosity of the polyolefin-based membrane substrate are not particularly limited and the porosity thereof is preferably 10 to 95%, pore size (diameter) thereof is preferably 0.1 to 50 μm. When the pore size and porosity are lower than 0.1 μm and 10%, respectively, the membrane substrate serves as an ohmic layer, and when the pore size and porosity are higher than 50 μm and 95%, respectively, mechanical and physical properties thereof cannot be maintained. In addition, the polyolefin-based membrane substrate may be in the form of a fiber or membrane.

In the organic/inorganic composite porous membrane formed by coating the polyolefin membrane substrate with a mixture of inorganic particles and binder polymer, as mentioned above, both the substrate and the active layer have porous structures due to pores naturally present in the membrane and the spaces provided between inorganic particles formed on the substrate. The pore size and porosity of the organic/inorganic composite porous membrane greatly depend on the size of inorganic particles. When inorganic particles having a diameter of 1 μm or less are for example used, the formed pores have also a size of 1 μm or less. These porous structures are filled with the subsequently incorporated electrolyte and the filled electrolyte transfers ions. Accordingly, the pore size and porosity are factors important in controlling ionic conductivity of organic/inorganic composite porous membrane.

The thickness of active layer having porous structures formed by coating a polyolefin membrane substrate with the mixture is not particularly limited and is preferably 0.01 to 100 μm. In addition, the pore size and porosity of the active layer are 0.001 to 10 μm and 5 to 95%, respectively and the pore size and porosity are not limited thereto.

The pore size and porosity of the organic/inorganic composite porous membrane are preferably 0.001 to 10 μm and 5 to 95%, respectively. In addition, the thickness of the organic/inorganic composite porous membrane is not particularly limited and may be controlled taking into consideration battery performance. The pore size is preferably 1 to 100 μm, more preferably 1 to 30 μm.

For example, the cathode is prepared by applying a cathode mix comprising a cathode active material, a conductive material and a binder to a cathode current collector, followed by drying and pressing. The cathode mix may further comprise a filler, if necessary.

The cathode current collector is generally produced to have a thickness of 3 to 500 μm. There is no particular limit to the cathode current collector, so long as it has suitable conductivity without causing adverse chemical changes in the produced battery. As examples of the cathode current collector, mention may be made of stainless steel, aluminum, nickel, titanium, sintered carbon, and aluminum or stainless steel surface-treated with carbon, nickel, titanium, silver or the like. If necessary, these current collectors may also be processed to form fine irregularities on the surface thereof so as to enhance adhesion to the cathode active materials. In addition, the current collectors may be used in various forms including films, sheets, foils, nets, porous structures, foams and non-woven fabrics.

The conductive material is commonly added in an amount of 1 to 30% by weight, based on the total weight of the mixture including the cathode active material. Any conductive material may be used without particular limitation so long as it has suitable conductivity without causing adverse chemical changes in the produced secondary battery. Examples of conductive materials that can be used in the present invention include graphite such as natural or artificial graphite; carbon black such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component which enhances binding of an electrode active material to a conductive material and current collector. The binder is commonly added in an amount of 1 to 30% by weight, based on the total weight of the compound including the anode active material. Examples of the binder include polyvinylidene, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene propylene diene terpolymer (EPDM), sulfonated EPDM, styrene butadiene rubber, fluororubbers and various copolymers.

The filler is a component used to inhibit expansion of the cathode. There is no particular limit to the filler, so long as it does not cause adverse chemical changes in the produced battery and is a fibrous material. As examples of the filler, there may be used olefin polymers such as polyethylene and polypropylene; and fibrous materials such as glass fibers and carbon fibers.

For example, the anode is prepared by applying an anode active material to an anode current collector, followed by drying. The anode active material may further comprise the afore-mentioned ingredients, i.e., the conductive material, the binder and the filler.

The anode current collector is generally produced to have a thickness of 3 to 500 μm. There is no particular limit to the anode current collector, so long as it has suitable conductivity without causing adverse chemical changes in the produced battery. Examples of the anode current collector include copper, stainless steel, aluminum, nickel, titanium, sintered carbon, and copper or stainless steel surface-treated with carbon, nickel, titanium or silver, and aluminum-cadmium alloys. Similar to the cathode current collector, if necessary, these current collectors may also be processed to form fine irregularities on the surface thereof so as to enhance adhesion to the anode active materials. In addition, the current collectors may be used in various forms including films, sheets, foils, nets, porous structures, foams and non-woven fabrics.

In addition, examples of anode active materials that can be used in the present invention include carbons such as hard carbons and graphite carbons; metal composite oxides such as $Li_yFe_2O_3$ ($0 \leq y \leq 1$), $Li_yWO_2$ ($0 \leq y \leq 1$), $Sn_xMe_{1-x}Me'_yO_z$ (Me: Mn, Fe, Pb, Ge; Me': Al, B, P, Si, Group I, II and III elements of the Periodic Table, halogens; 0<x≤1; 1≤y≤3; 1≤z≤8); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$ and the like; conductive polymers such as polyacetylene; and Li—Co—Ni materials.

The electrolyte is composed of a non-aqueous electrolyte and a lithium salt.

Examples of the non-aqueous electrolytic solution include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate and combinations thereof.

Preferably, a combination of one or more of a cyclic carbonate solvent and a linear carbonate solvent is used.

In addition, preferably, ethylene carbonate or a combination of ethylene carbonate and ethylmethylcarbonate is used.

The lithium salt is a material that is readily soluble in the above-mentioned non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, imide and a combination thereof.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally contain carbon dioxide gas.

In a preferred embodiment, the secondary battery may be a pouch battery in which an electrode assembly is sealed in a pouch-type case made of a laminate sheet including a resin layer and a metal layer.

For example, the laminate sheet may have a structure including an inner resin layer, a blocking metal layer and an outer resin layer. The outer resin layer should have tensile strength and weatherability equal to or higher than a predetermined level in order to secure superior resistance to external environments. In this regard, the polymer resin for the outer resin layer is preferably a polyethylene terephthalate (PET) and drawn nylon film. The blocking metal layer is preferably aluminum to prevent incorporation and leakage of foreign materials such as gas and humidity and improve strength of the battery case. The polymer resin for the inner resin layer is preferably a polyolefin resin which has thermal fusion (thermal adhesion) and low absorbance in order to inhibit invasion of the electrolyte and is not swollen or precipitated by the electrolyte, more preferably undrawn polypropylene (CPP).

BRIEF DESCRIPTION OF THE DRAWINGS

The above and other objects, features and other advantages of the present invention will be more clearly understood from the following detailed description taken in conjunction with the accompanying drawings, in which.

BEST MODE

Figure 1:
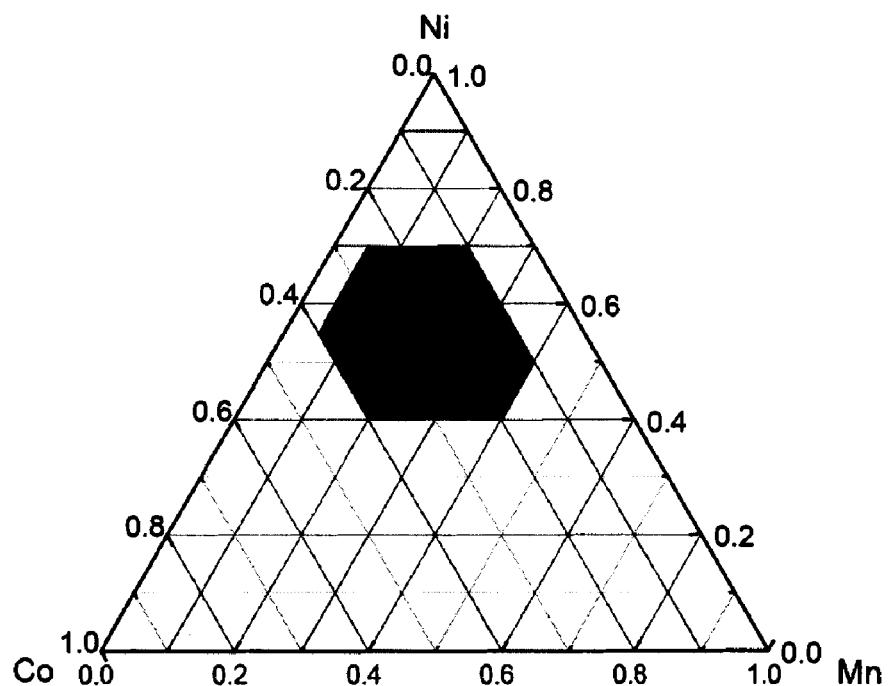
FIG. 1 is a schematic view illustrating the crystal structure of a second cathode material according to one embodiment of the present invention.
Figure 2:
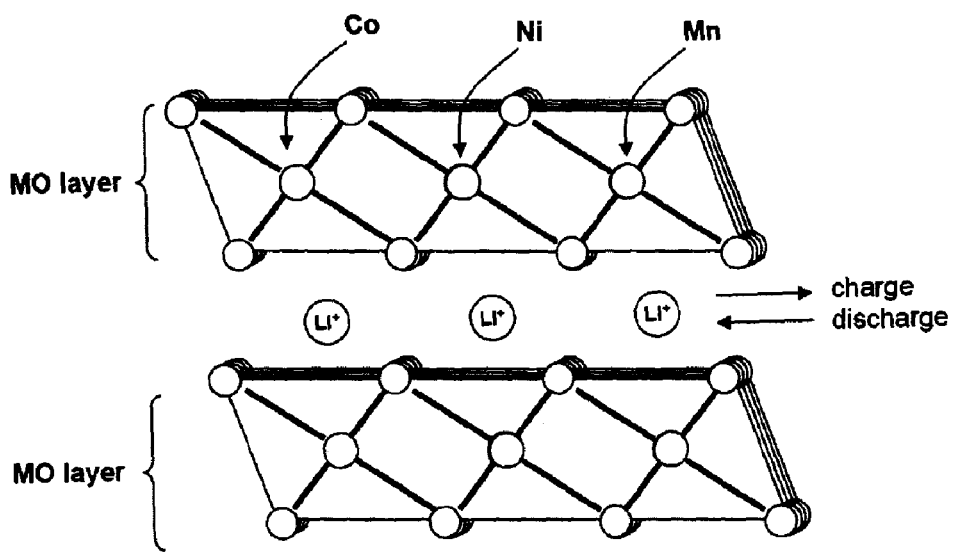
FIG. 2 is a graph showing a preferred composition range of a second cathode material according to one embodiment of the present invention.

Now, the present invention will be described in more detail with reference to the following examples. These examples are provided only for illustrating the present invention and should not be construed as limiting the scope and spirit of the present invention.

Preparation Example 1

1-1. Preparation of Second Cathode Material

Mixed hydroxide MOOH ($M=Ni_{4/15}(Mn_{1/2}Ni_{1/2})_{8/15}Co_{0.2}$) was used as a mixed transition metal precursor, the mixed hydroxide was mixed with $Li_2CO_3$ at a stoichiometric ratio (Li:M=1.02:1), and the mixture was sintered in air at 920° C. for 10 hours to prepare $LiNi_{0.53}Co_{0.2}Mn_{0.27}O_2$. At this time, secondary particles did not collapse and were still maintained.

It could be confirmed by X-ray analysis that all samples had well-grown layer crystal structures. In addition, unit cell volume did not considerably vary as sintering temperature increased. This means that considerable oxygen deficiency and considerable increase in anion mixing did not occur and evaporation of lithium substantially did not occur.

It was confirmed that $LiNi_{0.53}Co_{0.2}Mn_{0.27}O_2$ has a structure in which nickel is incorporated in about 3.9 to about 4.5% in a reversible lithium layer and a suitable amount of $Ni^{2+}$ is incorporated in the reversible lithium layer, thus exhibiting structural stability.

1-2. Preparation of Organic/Inorganic Composite Porous Membrane (PVdF-CTFE/$BaTiO_3$)

About 5% by weight of a polyvinylidene fluoride-chlorotrifluoroethylene copolymer (PVdF-CTFE) was dissolved in acetone at a temperature of 50° C. for about 12 hours to prepare a polymer solution. A $BaTiO_3$ powder was added to this polymer such that $BaTiO_3$/PVdFCTFE was 90/10 (wt % ratio), the $BaTiO_3$ powder was crushed and ground for 12 hours or longer using a ball mill method to prepare a slurry. The particle size of $BaTiO_3$ of the slurry thus prepared was controlled depending on the size (particle size) of beads used for the ball mill method and application time of the ball mill method. In Example 1, the $BaTiO_3$ powder was ground to a particle size of about 400 nm to prepare a slurry. The slurry thus prepared was coated on a polyethylene membrane (porosity of 45%, thickness of 18 μm) using a dip coating method and the coating thickness was controlled to about 3.5 μm. The pore size and porosity in the active layer coated on the polyethylene membrane was measured using a porosimeter. As a result, the pore size and porosity were 0.5 μm and 58%, respectively.

Example 1

LiCoO$_2$ having a monolithic structure and D50 of about 15 to about 20 μm and LiNi$_{0.53}$CO$_{0.2}$Mn$_{0.27}$O$_2$ having D50 of about 5 to 8 μm, as an agglomerate of micro particles a size of about 1 to about 2 μm obtained in Preparation Example 1-1 were mixed at a ratio of 50:50 to prepare a cathode material mix.

The cathode material mix, Super P as a conductive material and polyvinylidene fluoride as a binder were mixed at a weight ratio 92:4:4, and N-methylpyrrolidone (NMP) was added thereto to prepare a slurry. The cathode slurry was applied to an aluminum collector, followed by drying in a vacuum oven at 120° C. to produce a cathode.

In addition, mesocarbon microbead (MCMB) as an anode active material, super P as a conductive material and PVdF as a binder were mixed at a weight ratio of 92:2:6, followed by dispersion in NMP and coating on a copper foil, to produce an anode.

An organic/inorganic composite porous membrane obtained in Preparation Example 1-2 was inserted between the anode and cathode thus obtained to manufacture an electrode assembly. The electrode assembly was added to a pouch-type case, an electrode lead was connected, and a solution consisting of ethylene carbonate (EC) and dimethyl carbonate (DMC) (1:1, volume ratio) containing 1M LiPF$_6$ was inserted as an electrolyte, followed by sealing to assemble a lithium secondary battery.

Example 2

A cathode material mix was prepared and a lithium secondary battery was produced in the same manner as in Example 1 except that a weight ratio of LiCoO$_2$ and LiNi$_{0.53}$Co$_{0.2}$Mn$_{0.27}$O$_2$ in the cathode material mix was 70:30.

Comparative Example 1

A cathode material mix was prepared and a lithium secondary battery was produced in the same manner as in Example 1 except that only LiCoO$_2$ was used instead of the cathode material mix.

Comparative Example 2

A cathode material mix was prepared and a lithium secondary battery was produced in the same manner as in Example 1 except that a weight ratio of LiCoO$_2$ and LiNi$_{0.53}$Co$_{0.2}$Mn$_{0.27}$O$_2$ in the cathode material mix was 40:60.

Comparative Example 3

A cathode material mix was prepared and a lithium secondary battery was produced in the same manner as in Example 1 except that LiNi$_{1/3}$CO$_{1/3}$Mn$_{1/3}$O$_2$ was used instead of LiNi$_{0.53}$Co$_{0.2}$Mn$_{0.27}$O$_2$.

Comparative Example 4

A lithium secondary battery was produced in the same manner as in Example 1 except that a porous membrane made of polypropylene was used as a membrane.

Experimental Example 1

In order to confirm effects associated with use of the cathode material mix, discharge capacity and cathode thickness of batteries obtained in Example 1 and Comparative Example 1 were measured. The results thus obtained are shown in Table 1.

TABLE 1

|  | Discharge capacity | Cathode thickness |
|---|---|---|
| Ex. 1 | 163.4 mAh | 3.727 |
| Comp. Ex. 1 | 152 mAh | 3.802 |

As can be seen from Table 1, the battery produced from, as a cathode active material, a cathode material mix of lithium cobalt oxide and lithium nickel-manganese-cobalt oxide, each having a predetermined composition, exhibited a discharge capacity increase of about 7% and a cathode thickness decrease of about 2%, as compared to a battery produced from only lithium cobalt oxide.

Experimental Example 2

In order to confirm discharge properties according to the mix ratio of the cathode material mix, discharge capacity (1C rate charge) of batteries produced in Examples 1 and 2 and the battery produced in Comparative Example 2 were measured at 0.2C, 0.5C, 1C, 1.5C and 2C rate and a ratio of discharge capacity at each C-rate with respect to 5C rate capacity was calculated. The results thus obtained are shown in FIG. 3.

Figure 3:
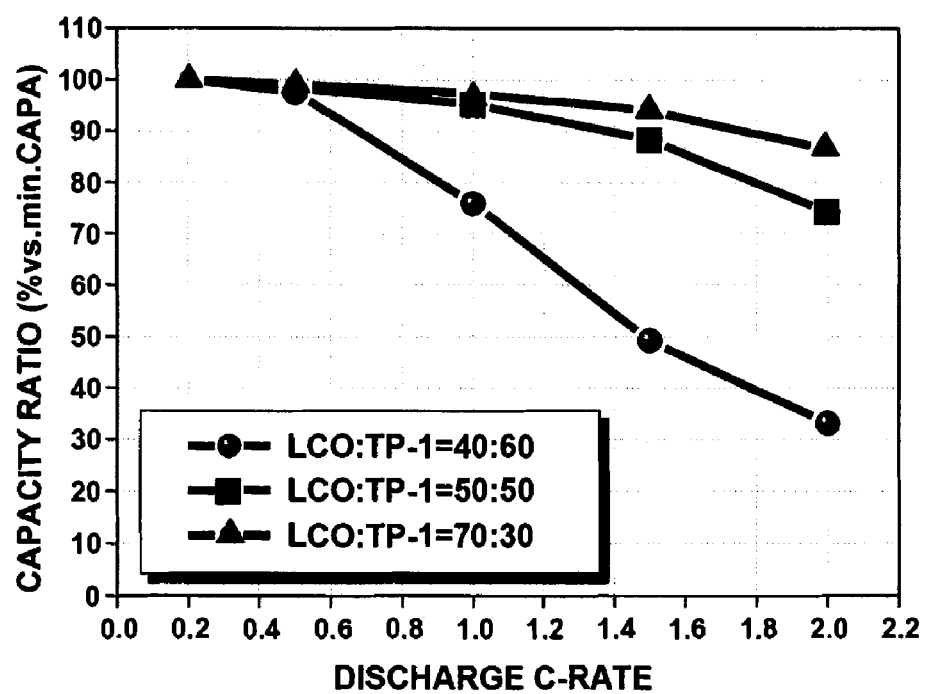
FIG. 3 is a graph showing a discharge capacity ratio in Experimental Example 1.

As can be seen from FIG. 3, discharge capacity of the battery of Comparative Example 2 rapidly decreases, as C-rate increases, and on the other hand, batteries of Examples 1 and 2 of the present invention exhibited considerably superior C-rate properties, and in particular, the battery of Example 2 containing 30% of oxide (b) exhibited superior C-rate properties in which discharge capacity is as high as 90% or more at a 2C rate. In addition, it can be seen that this improvement in C-rate properties was exhibited even at a low C-rate of 1C, and batteries of Examples 1 and 2 exhibited more considerable improvement in discharge properties, as C-rate thereof increases.

As apparent from the fore-going, use of combination of lithium cobalt oxide and lithium nickel manganese cobalt oxide alone cannot exhibit desired rate properties, and when a second cathode material having a predetermined composition is mixed with these substances at a specific ratio, synergetic effects can be obtained.

Experimental Example 3

In order to compare the secondary batteries containing the organic/inorganic composite porous membrane according to the present invention with a secondary battery containing a conventional membrane, a hot box test was performed.

The batteries produced in Examples 1 and 2 and the battery produced in Comparative Example 4 were exposed to 150° C., occurrence of combustion was confirmed and formation factors were measured during a formation process. The results thus obtained are shown in Table 2 below.

TABLE 2

|  | Combustion | Formation factors |
|---|---|---|
| Ex. 1 | maintained for 3 hours or more | 1.069 |
| Ex. 2 | maintained for 3 hours or more | 1.065 |
| Comp. Ex. 4 | Combustion when heated to 150° C. | 1.095 |

INDUSTRIAL APPLICABILITY

As apparent from the above description, the secondary battery of the present invention can exert high energy density as well as high capacity by using a combination of a first cathode material having a specific composition and a second cathode material having a specific composition, as a cathode material, and by controlling the mix ratio of these cathode materials to a predetermined range. In particular, the second cathode material has a stable layered structure and thus improves stability of crystal structures during charge and discharge. Accordingly, the battery containing this cathode material has advantages of high capacity, superior cycle stability and improved overall battery performance. In addition, the battery uses an organic/inorganic composite porous membrane as a membrane, thus exhibiting high temperature stability and inhibiting an increase in thickness caused by swelling during formation, as compared to batteries using conventional membranes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode composition, comprising:
a mixture of
(1) a first cathode material comprising a cathode material represented by Formula 1 below:

$$Li_x(Co_yA_mD_z)O_t \quad (1)$$

wherein $0.8 \leq x \leq 1.2$, $0 \leq z \leq 0.3$, $1.8 \leq t \leq 4.2$, $(0.8-m-z) \leq y \leq (2.2-m-z)$, $0 \leq m \leq 0.3$, A is at least one selected from Mg and Ca, and D is at least one selected from the group consisting of Ti, Zr, Hf, V, Nb, Ta; Cr, Mo, W, Mn, Tc, Re, Fe, Ru, Os, Co, Rh, Ir, Ni, Pd, Pt, Cu, Au, Ag, Zn, Cd, Hg, B, Al, Ga, In, Tl, C, Si, Ge, Sn, Pb, N, P, As, Sb and Bi; and (2) a second cathode material selected from the group consisting of a second-(a) cathode material and a second-(b) cathode material, and a combination thereof, said second-(a) cathode material comprising a cathode material represented by Formula 2a below:

$$Li_x(Ni_{1-a-b}Mn_aCo_b)_yO_2 \quad (2a)$$

wherein $0.05 \leq a \leq 0.4$, $0.1 \leq b \leq 0.4$, $0.4 \leq 1-a-b \leq 0.7$, $0.95 \leq x \leq 1.05$, $1.9 \leq x+y \leq 2.3$; and said second-(b) cathode material comprising a cathode material which contains a transition metal mixture of Ni, Mn and Co, has an average oxidation number of all transition metals except for lithium, larger than +3 and satisfies Equations 2b and 2c below:

$$1.1 < m(Ni)/m(Mn) < 1.5 \quad (2b)$$

$$0.4 < m(Ni^{2+})/m(Mn^{4+}) < 1 \quad (2c)$$

wherein m(Ni)/m(Mn) is a molar ratio of nickel to manganese and $(Ni^{2+})/m(Mn^{4+})$ is a molar ratio of $Ni^{2+}$ to $Mn^{4+}$, wherein a mix ratio of the two cathode materials (first cathode material:second cathode material) is 50:50 to 90:10.

2. The cathode composition according to claim 1, wherein a mix ratio of the cathode materials is 50:50 to 70:30.

3. The cathode composition according to claim 1, wherein the first cathode material is $LiCoO_2$.

4. The cathode composition according to claim 1, wherein, in the second-(a) cathode material, lithium ions are intercalated and deintercalated between mixed transition metal oxide layers ("MO layers") and some Ni ions derived from MO layers are inserted into intercalation and deintercalation layers of the lithium ions ("reversible lithium layer") to bond the MO layers.

5. The cathode composition according to claim 4, wherein $Ni^{2+}$ and $Ni^{3+}$ are present together in the MO layers and some $Ni^{2+}$ is inserted into the reversible lithium layer.

6. The cathode composition according to claim 5, wherein a molar fraction of $Ni^{2+}$ inserted into the reversible lithium layer in the second-(a) cathode material is 0.03 to 0.07, based on the total weight of transition metals of the second-(a) cathode material.

7. The cathode composition according to claim 1, wherein, in the second-(b) cathode material, m(Ni)/m(Mn) satisfies $1.2 \leq m(Ni)/m(Mn) \leq 1.4$.

8. The cathode composition according to claim 1, wherein, in the second-(b) cathode material, the average oxidation number of transition metals other than lithium is higher than 3.0 and is lower than or equal to 3.5.

9. The cathode composition according to claim 1, wherein the nickel in the second-(b) cathode material is composed of nickel (a) present in an excessive amount, as compared to the manganese content, and nickel (b) present in an amount corresponding to the manganese content.

10. The cathode composition according to claim 1, wherein the nickel in the second-(b) cathode material has an average oxidation number higher than 2+.

11. The cathode composition according to claim 9, wherein the nickel (a) is $Ni^{3+}$.

12. The cathode composition according to claim 9, wherein an average oxidation number of the nickel (b) is higher than 3.0 and is lower than or equal to 3.5.

13. The cathode composition according to claim 9, wherein the nickel (b) contains $Ni^{2+}$ and $Ni^{3+}$.

14. The cathode composition according to claim 9, wherein $Ni^{3+}$ content ranges from 11 to 60% of the nickel (b) with the content corresponding to the content of manganese.

15. The cathode composition according to claim 1, wherein the content of Ni ($Ni^{2+}$) intercalated into lithium sites in the second-(b) cathode material is lower than 5 mol %.

16. The cathode composition according to claim 1, wherein the first cathode material is a monolithic particle and the second cathode material is an agglomerated particle composed of an agglomerate of micro particles.

17. The cathode composition according to claim 1, wherein the first cathode material has a D50 of 15 μm or more and the second cathode material has a D50 of 8 μm or less.

18. The cathode composition according to claim 17, wherein the first cathode material has a D50 of 20 to 30 μm and the second cathode material has a D50 of 4 to 7 μm.

19. The cathode composition according to claim 18, wherein 90% or more of the second cathode material is an agglomerate of micro particles having a size of 1 to 4 μm.

* * * * *